(12) United States Patent
Wu

(10) Patent No.: US 12,733,595 B2
(45) Date of Patent: Sep. 15, 2026

(54) ENVIRONMENTAL-FRIENDLY LUMINOUS FLOWERPOT

(71) Applicant: Zhejiang Dingsheng Outdoor Living Products Co., Ltd., Taizhou City (CN)

(72) Inventor: Yuxuan Wu, Taizhou City (CN)

(73) Assignee: Zhejiang Dingsheng Outdoor Living Products Co., Ltd., Taizhou City (CN)

( * ) Notice: Subject to any disclaimer, the term of this patent is extended or adjusted under 35 U.S.C. 154(b) by 140 days.

(21) Appl. No.: 18/819,229

(22) Filed: Aug. 29, 2024

(65) Prior Publication Data

US 2025/0280768 A1 Sep. 11, 2025

(30) Foreign Application Priority Data

Mar. 11, 2024 (CN) ........................ 202420469615.8

(51) Int. Cl.

| | |
|---|---|
| ***F21S 9/03*** | (2006.01) |
| ***A01G 9/02*** | (2018.01) |
| ***F21V 33/00*** | (2006.01) |
| *F21Y 113/00* | (2016.01) |
| *F21Y 115/10* | (2016.01) |

(52) U.S. Cl.

CPC ................ *A01G 9/021* (2013.01); *F21S 9/03* (2013.01); *F21V 33/0028* (2013.01); *F21Y 2113/00* (2013.01); *F21Y 2115/10* (2016.08)

(58) Field of Classification Search

CPC ... A01G 9/021; A01G 9/02; F21S 9/03; F21V 33/0028; F21Y 2113/00; F21Y 2115/10

See application file for complete search history.

(56) References Cited

U.S. PATENT DOCUMENTS

| | | | | |
|---|---|---|---|---|
| 5,879,071 A * | 3/1999 | Sanford, Jr. | F21V 33/0028 | 47/65.5 |
| 6,286,252 B1 * | 9/2001 | O'Neal | A01G 9/021 | 47/48.5 |
| 2012/0083929 A1 * | 4/2012 | Conrad, Jr. | A01G 9/02 | 700/284 |
| 2013/0340335 A1 * | 12/2013 | Shieh | A01G 9/02 | 47/66.6 |
| 2018/0275330 A1 * | 9/2018 | McRae | F21V 33/0028 | |
| 2022/0232779 A1 * | 7/2022 | Suarez | A01G 9/02 | |
| 2023/0111009 A1 * | 4/2023 | Xiong | A01G 9/249 | 47/21.1 |

* cited by examiner

*Primary Examiner* — Kimberly S Berona
*Assistant Examiner* — Steven J Shur
(74) *Attorney, Agent, or Firm* — Wang Law Firm, Inc.

(57) ABSTRACT

An environmental-friendly luminous flowerpot comprises a pot body which is semitransparent and is made of an herb-plastic composite environmental-friendly material. One or more light-emitting elements which are electrically connected to a solar device are disposed inside the pot body. The pot body can be made to have various shapes in various textures. When light is transmitted to the outside through an inner peripheral wall of the pot body, the light rays bring out different visual effects according to the various shapes in various textures, ensuring the effects of beautifying and decorating. Solar energy is used to supply power, and the light control device disposed on the solar module is capable of automatically turning off light during the day and automatically turning on light at night, saving energy and protecting the environment.

10 Claims, 8 Drawing Sheets

ENVIRONMENTAL-FRIENDLY LUMINOUS FLOWERPOT

TECHNICAL FIELD OF THE INVENTION

The present invention relates to a field of flowerpots, and in particular to an environmental-friendly luminous flowerpot.

BACKGROUND OF THE INVENTION

A flowerpot is a container for flower cultivation, and has an inverted circular truncated cone shape or an inverted truncated pyramid shape with a large opening and a small bottom end. Flowerpots widely applied to landscaping and landscape engineering, and can not only be used for flower cultivation, but also ensure effects of beauty and decoration. However, most of existing flowerpots cannot shine and beautify environments at night.

In order to ensure a good visually appealing effect, a Chinese patent CN202857389U (patent No.: 201220487474. X) disclosed a gardening luminous flowerpot, comprising a pot body having a plurality of through holes on a peripheral wall of the pot body; a transparent body embedded in each through hole; and light-emitting components mounted inside the pot body. The flowerpot has the light-emitting components mounted inside the pot body, and light is transmitted from an inside to an outside by means of the transparent bodies, so as to ensure effects of illumination and lightening, such that the flowerpot has a good decorative effect even at night. However, the production process, in which through holes are formed on the peripheral wall of the pot body and then transparent materials are adhered to the through holes on the peripheral wall of the pot body, has low efficiency and high costs, and the materials used therein do not meet requirements for environmental protection.

In addition, a material used for manufacturing the existing flowerpots is mostly ceramic, plastic or wood. Ceramic flowerpots are the most aesthetic, but are heavy and prone to damage, resulting in high production costs as they are difficult to transport. Plastic flowerpots are light, but have poor physical properties, and are difficult to degrade, polluting the environment. Wood-made flowerpots are not prone to damage, but have a short service life and poor durability.

SUMMARY OF THE INVENTION

It is an object of the present invention to provide an environmental-friendly luminous flowerpot, which has a more rational structure, can save energy and reduce carbon emission, produce no secondary pollution, and is not prone to damage. The flowerpot, made of a semitransparent and environmentally-friendly material, is easy to process, is energy saving and environmentally friendly, and has low production costs.

For achieving the above object, the environmental-friendly luminous flowerpot comprises a pot body, one or more light-emitting elements disposed inside the pot body; and a solar device; wherein, the pot body is semitransparent and is made of an herb-plastic composite environmental-friendly material; the one or more light-emitting elements are electrically connected to the solar device.

Preferably, the pot body is manufactured by following steps: the herb-plastic composite environmental-friendly material is melted at a high temperature and then pressed or injected or rolled by an apparatus to form the pot body with an expected shape and texture; plant particles having different colors are added in the herb-plastic composite environmental-friendly material during melting so as to produce the multi-colored semitransparent pot body. Preferably, a tray is disposed inside the pot body, a supporting rod is connected to the tray and a bottom of the pot body to support the tray; and the tray divides an inner space of the pot body into an upper layer for cultivating plants (flowers) and a lower layer for mounting the one or more light-emitting elements which are resisted against an inner wall of the pot body.

Preferably, the supporting rod is a hollow tube with a top opening and a bottom opening which vertically stands between the tray and the bottom of the pot body; the tray has a first central hole and the bottom of the pot body has a second central hole, both central holes allowing water to pass through, the supporting rod has a top opening which communicates with the first central hole, and a bottom opening which communicates with the second central hole centered on the bottom of the pot body, so that the load bearing capacity is improved, the pot body is reinforced and water draining is ensured.

Preferably, a filtering element is disposed in the top opening of the supporting rod for allowing the water to pass through and prevent mud from escaping.

Preferably, the pot body comprises an outer pot body with an outer top opening and an inner pot with an inner top opening disposed inside the outer pot body, and a space is defined between the outer pot body and the inner pot body for mounting the one or more light-emitting elements; the inner pot body has an annular flange extending outward at the inner top opening to join with an edge of the outer top opening of the outer pot body, the inner pot body and the outer pot body are mounted together to form a complete outer pot body, the inner pot body is used for cultivating plants.

Preferably, the pot body comprises an outer pot body with an outer top opening and an inner pot with an inner top opening disposed inside the outer pot body, and a space is defined between the outer pot body and the inner pot body for mounting the one or more light-emitting elements; the inner pot body is a hard pot body, the outer pot body has a plurality of steps each protruding from an annular inner wall of the outer pot body at the inner top opening, and an annular mounting groove is formed at the annular inner wall of the outer pot body over the plurality of steps for receiving a top edge of the inner pot body at the top opening; and the top edge of the inner pot body inside the mounting groove is sealed to the annular inner wall of the outer pot body by waterproof glue, fully improving the sealing and waterproofing performance.

Preferably, the pot body comprises an outer pot body with an outer top opening and an inner pot with an inner top opening disposed inside the outer pot body, and a space is defined between the outer pot body and the inner pot body for mounting the one or more light-emitting elements; the inner pot body is a soft pot body and has a mounting ring extending outward at the inner top opening, the mounting ring has a plurality of mounting holes distributed at intervals; the outer pot body has a plurality of protrusions protruding from an annular inner wall of the top opening of the outer pot body; a plurality of supporting arc bars distributed annually for supporting the inner pot body is connected to the plurality of protrusions, each supporting arc bar has one or more screw holes, the inner pot body is connected to the outer pot body by a plurality of screws, each screw passing through the corresponding mounting hole of the inner pot body and the corresponding screw hole to be screwed into. The soft inner pot body can be integrally waterproof, and is convenient for assembly.

Preferably, the tray is horizontally disposed in a middle of the pot body, a periphery of the tray is resisted against and sealed with the inner wall of the pot body. The one or more light-emitting elements are a plurality of LED lamps, which are distributed annularly at regular intervals on an annular inner wall of the pot body. Alternatively, the one or more light-emitting elements are a plurality of LED lamps, which are distributed annularly at regular intervals on an annular inner wall of the outer pot body.

Preferably, the solar device comprises a solar photovoltaic panel and an energy storage battery, a solar module is connected between the solar photovoltaic panel and the energy storage battery, and a light control device is disposed on the solar module. The pot body has a wire outlet hole at the bottom of the pot body, a waterproof wire passes through the wire outlet hole to electrically connect the one or more light-emitting elements with the solar device. During the day, the light control device automatically turns off light, and solar energy is converted into electric energy to charge the energy storage battery; and at night, the light control device automatically turns on light, and the energy storage battery supplies power to the LED lamps.

Preferably, the semitransparent pot body has a charging socket on a surface of the pot body; when the flowerpot is placed indoors and cannot be irradiated by sunlight, a charger is directly plugged to supply power to the light-emitting elements; and when the flowerpot is placed outdoors, a solar power supply plug is plugged, and the solar device supplies power to the one or more light-emitting elements.

Preferably, the herb-plastic composite environmental-friendly material is a reinforced composite material prepared by mixing natural plant fibers with polypropylene or polyethylene and by means of a mixing technique; the natural plant fibers being one of or a mixture of several of coir fibers, pulp fibers, rice husk, rice bran, rice straw, wheat straw, corn straw, bamboo fibers, bagasse, reed canes, coconut fibers, pine wood, and arbor; the plant fiber content in the herb-plastic composite environmentally-friendly material is 30%-70% (wt). During the manufacture of the flowerpot made of the herb-plastic composite environmentally-friendly material, plant particles having different colors are added in the herb-plastic composite environmental-friendly material during melting so as to produce the multi-colored semitransparent pot body.

Compared to the prior art, the environmental-friendly luminous flowerpot of the present invention has the following advantages: the pot body is a semitransparent pot body made of the herb-plastic composite environmental-friendly material, the light-emitting elements are disposed inside the pot body, and the pot body can be made with an expected shape and texture. When light is transmitted to the outside through the wall of the pot body, the light rays bring out different visual effects according to the various shapes and textures of the pot body, so as to ensure effects of beautifying and decorating. Solar energy is used to supply power, and the light control device disposed on the solar module is capable of automatically turning off light during the day and automatically turning on light at night, saving energy and protecting the environment. The flowerpot of the present invention has a rational structure, is easy to process, and has low costs as there is no need to make a plurality of holes on the pot body for transmitting light. Light is directly transmitted to the outside through the semitransparent pot body, ensuring effects of illuminating and beautifying. In addition, natural plant fibers are added to the pot body, so that no secondary pollution is generated, energy is saved and carbon emission is reduced. Therefore, the flowerpot has good physical properties, and is not prone to damage.

DETAILED DESCRIPTION OF THE INVENTION

Figure 1:
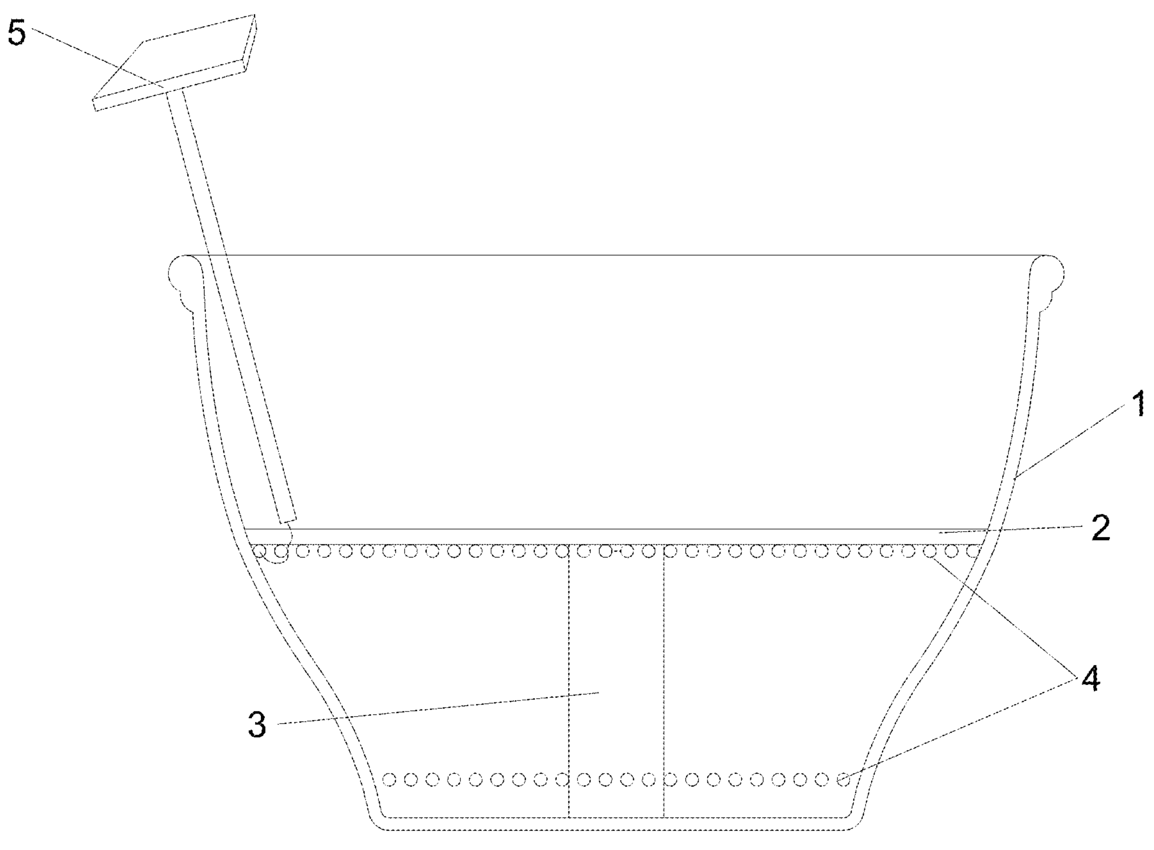
FIG. 1 is a view of an environmental-friendly luminous flowerpot according to Embodiment 1 of the present invention.
Figure 2:
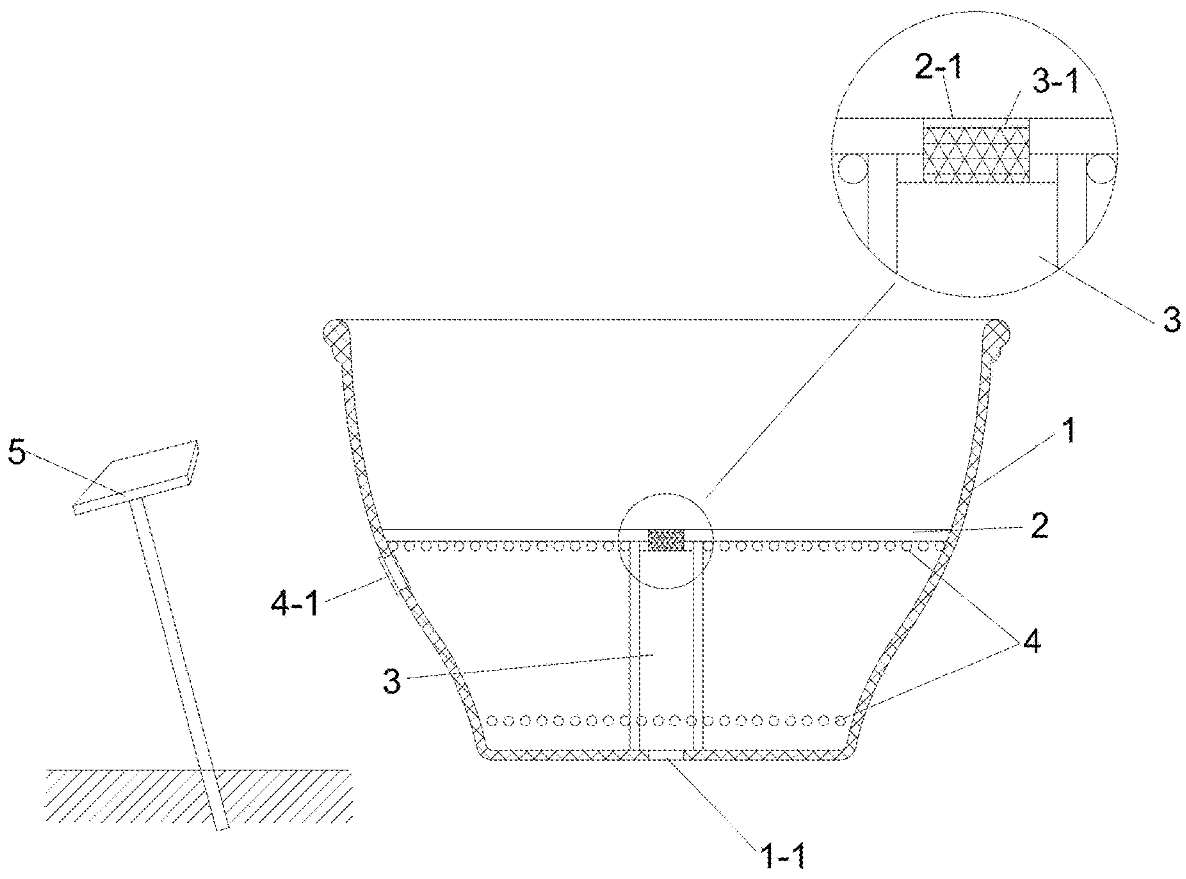
FIG. 2 is a sectional view of the environmental-friendly luminous flowerpot according to Embodiment 1 of the present invention.
Figure 3:
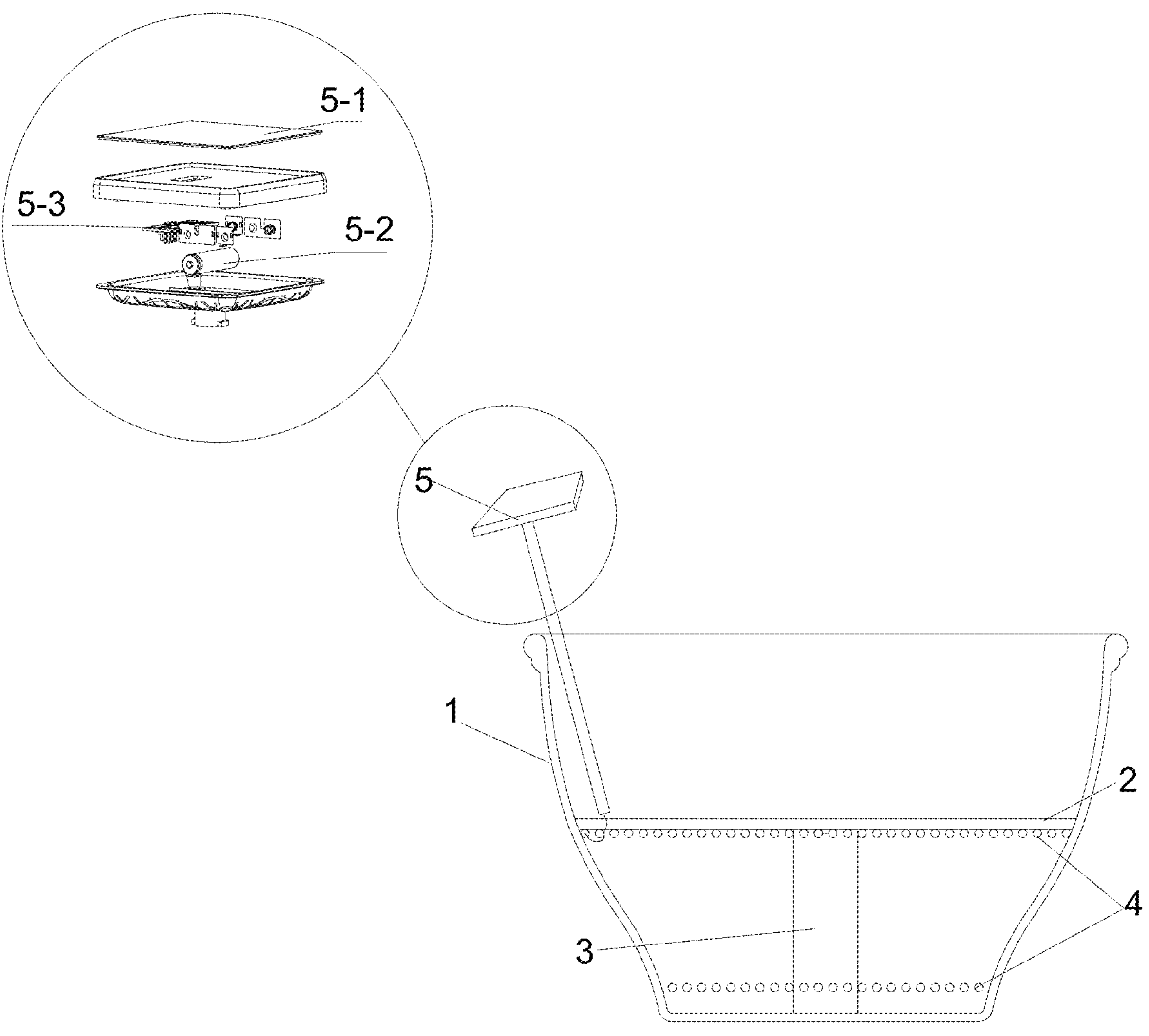
FIG. 3 is a view of FIG. 1 with an exploded view of a solar device according to Embodiment 1 of the present invention.

The present invention will be further described below in detail by embodiments with reference to the accompanying drawings.

Embodiment 1

FIGS. 1-3 and 5 show a preferred Embodiment 1 of an environmental-friendly luminous flowerpot of the present invention. The environmental-friendly luminous flowerpot comprises a pot body 1; one or more light-emitting elements 4 disposed inside the pot body 1; a solar device 5; wherein, the pot body 1 is semitransparent and is made of an herb-plastic composite environmental-friendly material; the one or more light-emitting elements 4 are electrically connected to the solar device 5.

The specific structure of the flowerpot is as follows: the pot body 1 is manufactured by following steps: the herb-plastic composite environmental-friendly material is melted at a high temperature and then pressed or injected or rolled by an apparatus to form the pot body 1 with an expected shape and texture. A tray 2 is disposed inside the pot body 1, and the tray 2 divides an inner space of the pot body 1 into an upper layer for cultivating plants and a lower layer for mounting the one or more light-emitting elements 4 which are resisted against an inner wall of the pot body 1. The tray 2 has a first central hole 2-1 for allowing water to pass through. A supporting rod 3 is connected to the tray 2 and a bottom of the pot body 1 to support the tray 2. The supporting rod 3 is a hollow tube with a top opening and a bottom opening which vertically stands between the tray 2 and the bottom of the pot body 1. The bottom of the pot body 1 has a second central hole 1-1 for allowing water to pass through, the supporting rod 3 has a top opening which communicates with the first central hole 2-1, and a bottom opening which communicates with the second central hole 1-1 centered on the bottom of the pot body 1. A filtering element 3-1 is disposed in the top opening of the supporting rod 3 for allowing the water to pass through and prevent mud from escaping.

The one or more light-emitting elements 4 is disposed inside the semitransparent pot body 1 which comprises the upper layer and the lower layer. The one or more light-emitting elements 4 are a plurality of LED lamps which are distributed annularly at regular intervals on an annular inner wall of the pot body 1, and are electrically connected to the solar device 5. The solar device 5 comprises a solar photovoltaic panel 5-1 and an energy storage battery 5-2, a solar module 5-3 is connected between the solar photovoltaic panel 5-1 and the energy storage battery 5-2 and is capable of converting solar energy into electric energy to charge the energy storage battery 5-2 during the day, and the energy storage battery 5-2 supplies power to the one or more light-emitting elements 4 at night. The solar module has a light control device which automatically turns off light during the day and automatically turns on light at night.

The semitransparent pot body having an upper layer and a lower layer has a charging socket 4-1 on a surface of the pot body 1; when the flowerpot is placed indoors and cannot not be irradiated by sunlight, a charger is directly plugged to supply power to the light-emitting elements 4; and when the flowerpot is placed outdoors, a solar power supply plug is plugged, and the solar device 5 supplies power to the one or more light-emitting elements 4.

In the embodiment, the herb-plastic composite environmental-friendly material is a reinforced composite material prepared by mixing natural plant fibers with polypropylene or polyethylene and by means of a mixing technique, the natural plant fibers being one of or a mixture of several of coir fibers, pulp fibers, rice husk, rice bran, rice straw, wheat straw, corn straw, bamboo fibers, bagasse, reed canes, coconut fibers, pine wood, and arbor. The plant fiber content in the herb plastic composite environmental-friendly material is 30%-70% wt. Plant particles having different colors are added in the herb-plastic composite environmental-friendly material during melting so as to produce the multi-colored semitransparent pot body 1.

The specific manufacturing process for the flowerpot in this embodiment is as follows:

Step 1, crushing a plant filler into fibers having an average length of 1.50 mm;

Step 2, drying the raw material of step 1 at a temperature of 120 degrees centigrade for 2 hours;

mixing a PP/PE (polypropylene/polyethylene) material with the plant fibers using a mixing technique, so as to obtain an herb-plastic composite environmental-friendly material containing 30%-70% of plant fiber filler; and Step 3, using a special temperature management and ventilation injection molding machine to perform injection molding at 160-170 degrees centigrade to form the flowerpot; or forming the flowerpot by die casting.

Embodiment 2

Figure 4:
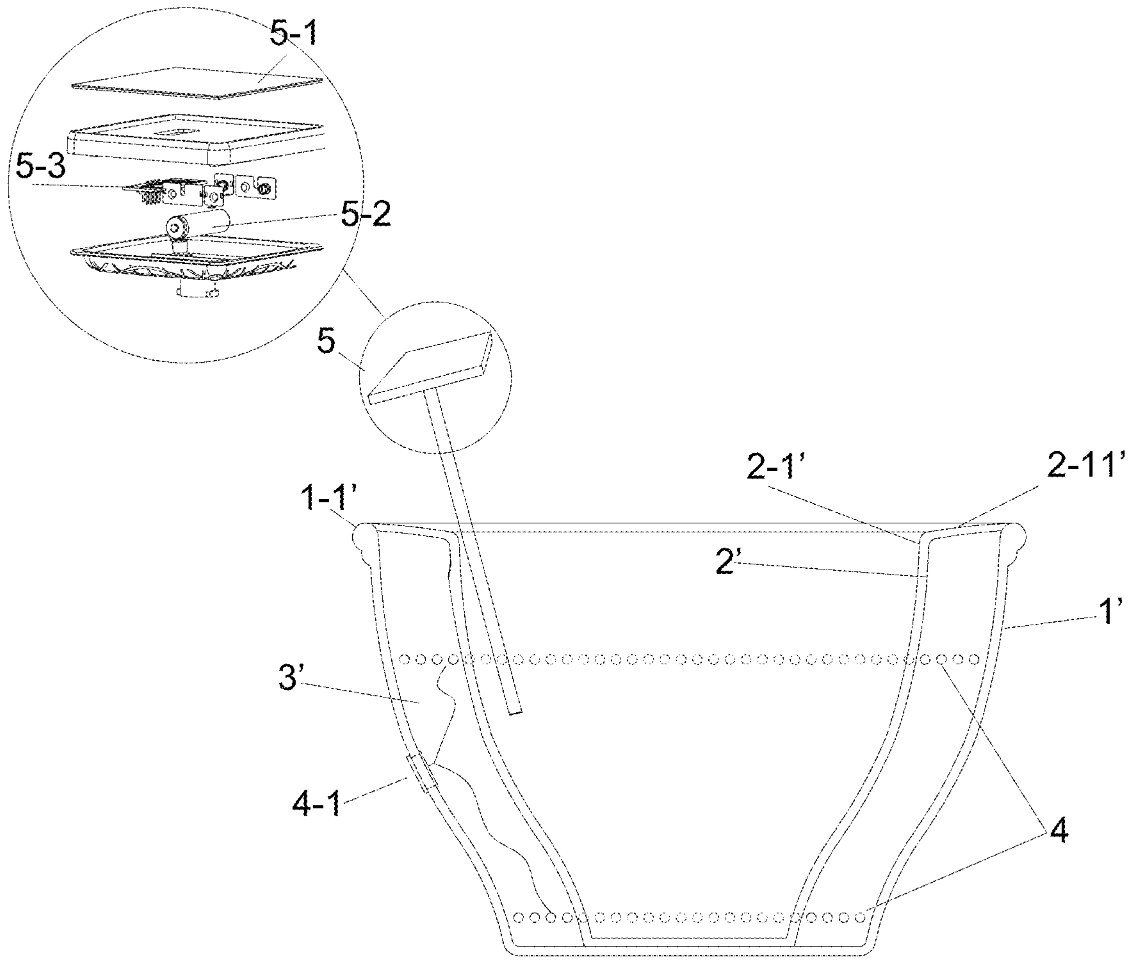
FIG. 4 is a view of an environmental-friendly luminous flowerpot with an exploded view of a solar device according to Embodiment 2 of the present invention.
Figure 5:
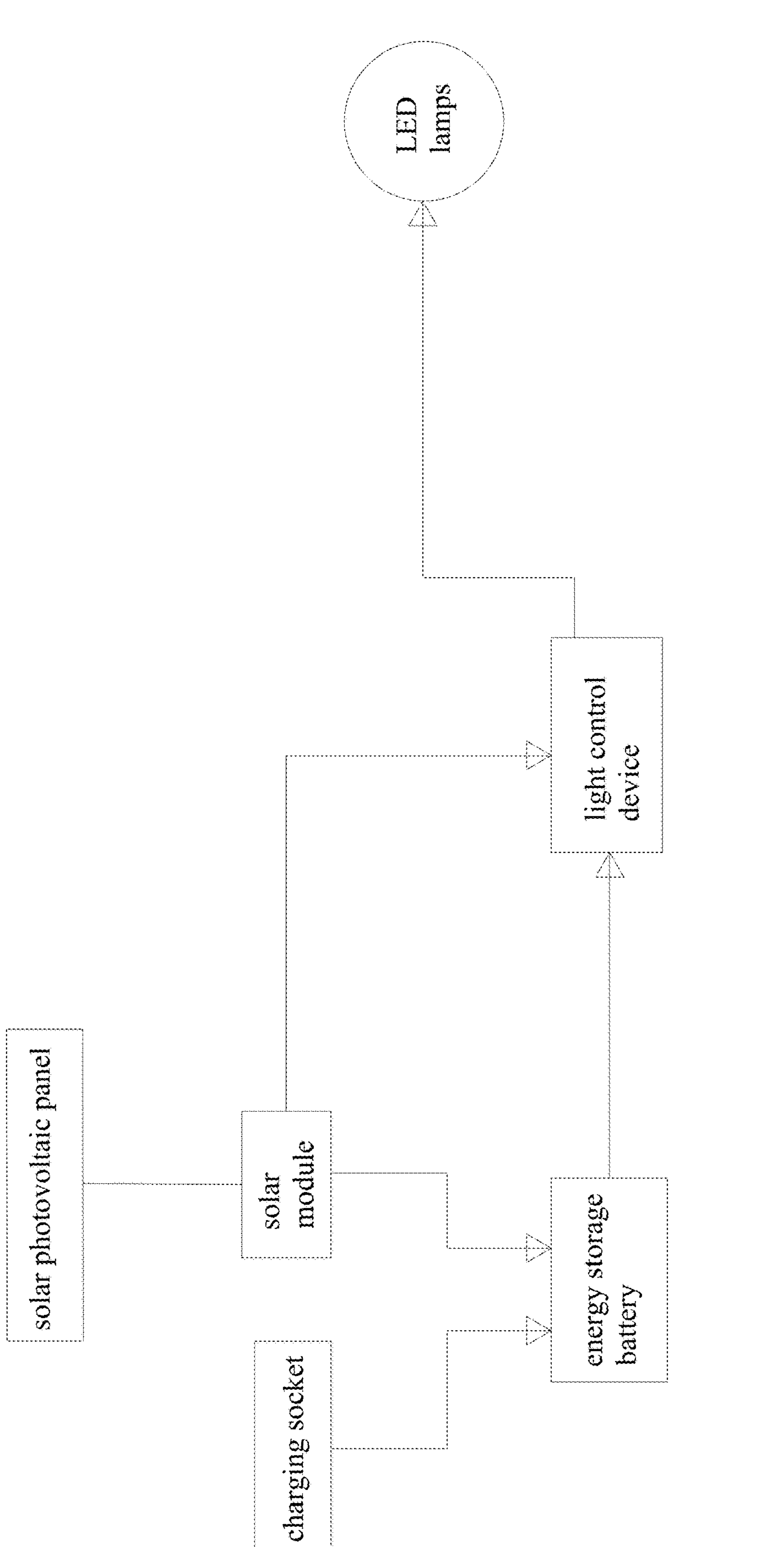
FIG. 5 is a circuit module diagram of the environmental-friendly luminous flowerpot according to Embodiment 1 and Embodiment 2 of the present invention.

FIGS. 4 and 5 show Embodiment 2 of the environmental-friendly luminous flowerpot of the present invention, which is different from Embodiment 1 in that: the pot body 1 comprises an outer pot body 1' with an outer top opening 1-1' and an inner pot 2' with an inner top opening 2-1' disposed inside the outer pot body 1', and a space 3' is defined between the outer pot body 1' and the inner pot body 2' for mounting the one or more light-emitting elements 4'; the inner pot body 2' has an annular flange 2-11' extending outward at the inner top opening 2-1' to join with an edge of the outer top opening 1-1' of the outer pot body 1', the inner pot body 2' and the outer pot body 1' are mounted together to form a complete outer pot body having an aesthetic appearance, the inner pot body 2' is used for cultivating plants.

The one or more light-emitting elements 4 disposed inside the semitransparent pot body are a plurality of LED lamps, which are distributed annularly at regular intervals on an annular inner wall of the outer pot body 1'.

Others structures are similar to those in Embodiment 1.

Embodiment 3

Figure 6:
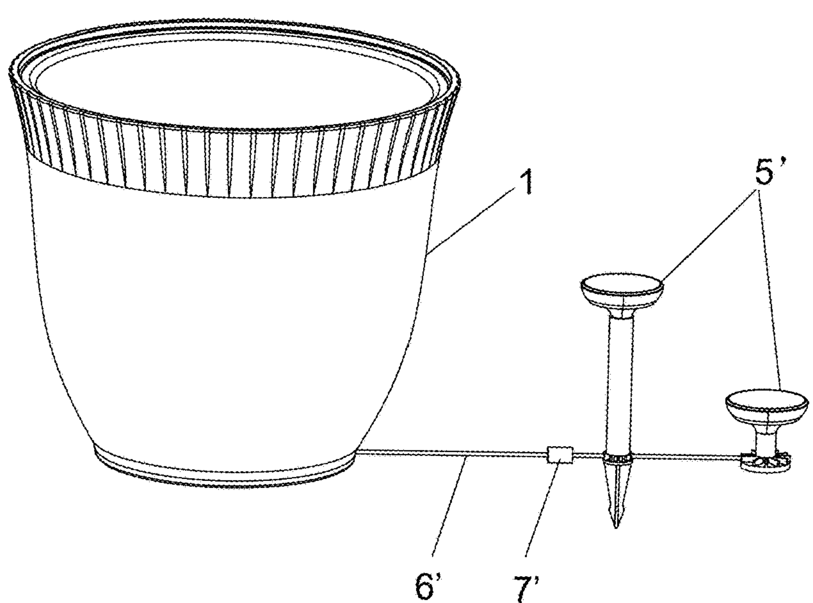
FIG. 6 is a perspective view of an environmental-friendly luminous flowerpot according to Embodiment 3 of the present invention.
Figure 7:
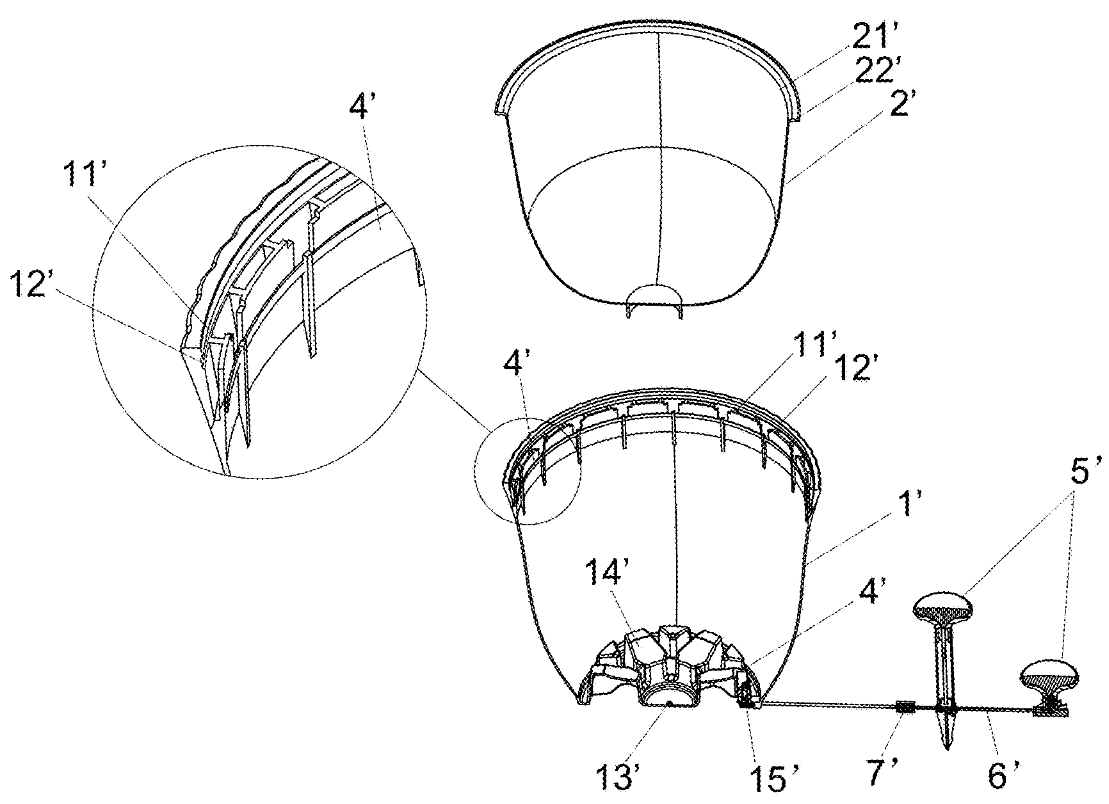
FIG. 7 is an exploded view of the environmental-friendly luminous flowerpot part of which is omitted according to Embodiment 3 of the present invention.

FIGS. 6 and 7 show Embodiment 3 of the environmental-friendly luminous flowerpot of the present invention, which is different from Embodiment 1 in that: the pot body 1 comprises an outer pot body 1' with an outer top opening 1-1' and an inner pot 2' with an inner top opening 2-1' disposed inside the outer pot body 1', and a space 3' is defined between the outer pot body 1' and the inner pot body 2' for mounting a lighting strip formed by a plurality of light-emitting elements 4'; the inner pot body 2' has an annular flange 2-11' extending outward at the inner top opening 2-1' to join with an edge of the outer top opening 1-1' of the outer pot body 1', the inner pot body 2' and the outer pot body 1' are mounted together to form a complete outer pot body having an aesthetic appearance, the inner pot body 2' is used for cultivating plants.

In order to further improve a waterproofing and sealing performance of the flowerpot, the inner pot body 2' is a hard pot body, the outer pot body 1' has a plurality of steps 11' each protruding from an annular inner wall of the outer pot body 1' at the inner top opening 1-1', and an annular mounting groove 12' is formed at the annular inner wall of the outer pot body 1' over the plurality of steps 11' for receiving a top edge 22' of the inner pot body 2' at the top opening 2-1'; and the top edge 22' of the inner pot body 2' inside the mounting groove 12' is sealed to the annular inner wall of the outer pot body 1' by waterproof glue, greatly improving the sealing performance between the inner pot body 2' and the outer pot body 1' at the inner top opening 1-1', preventing rainwater from permeating into the space 3' between the inner pot body 2' and the outer pot body 1' to affect an operation of the one or more light-emitting elements 44. The inner pot body 2' has a slope 21' at the inner top opening 2-1' of the inner pot body 2' for allowing rainwater to be effectively guided into the inner pot body 2', preventing rainwater from flowing into the bottom of the flowerpot and damaging the lighting strip (the plurality of light-emitting elements 4').

The outer pot body 1' has a third central hole 13' for allowing water to pass through at the bottom of the outer pot body 1', and a plurality of water retaining ribs 14' are distributed around the third central hole 13'. The pot body 1 has a wire outlet hole at the bottom of the pot body 1, a waterproof wire 6' passes through the wire outlet hole to electrically connect the one or more light-emitting elements 4 with the solar device 5, effectively preventing, in stormy weather, rainwater from flowing back via the third central hole 13' and the wire outlet hole to the space 3' to cause damage to the light strips. The solar device 5' may be an outdoor solar assembly and an indoor solar assembly, and is electrically connected to the one or more light-emitting elements 4' and a rechargeable battery in the flowerpot by means of the waterproof wire 6' and a connector 7'.

Finally, a cover 15' for limiting a wire is embedded and fixed in the wire outlet hole of the outer pot body 1', and correspondingly, the waterproof wire 6' is knotted over the cover 15' to prevent the waterproof wire 6' from being pulled off.

Embodiment 4

Figure 8:
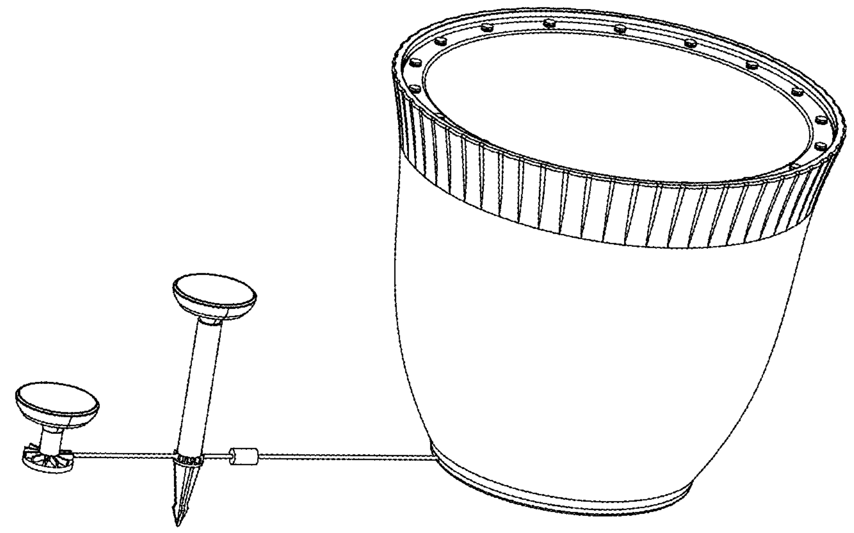
FIG. 8 is a perspective view of an environmental-friendly luminous flowerpot according to Embodiment 4 of the present invention.
Figure 9:
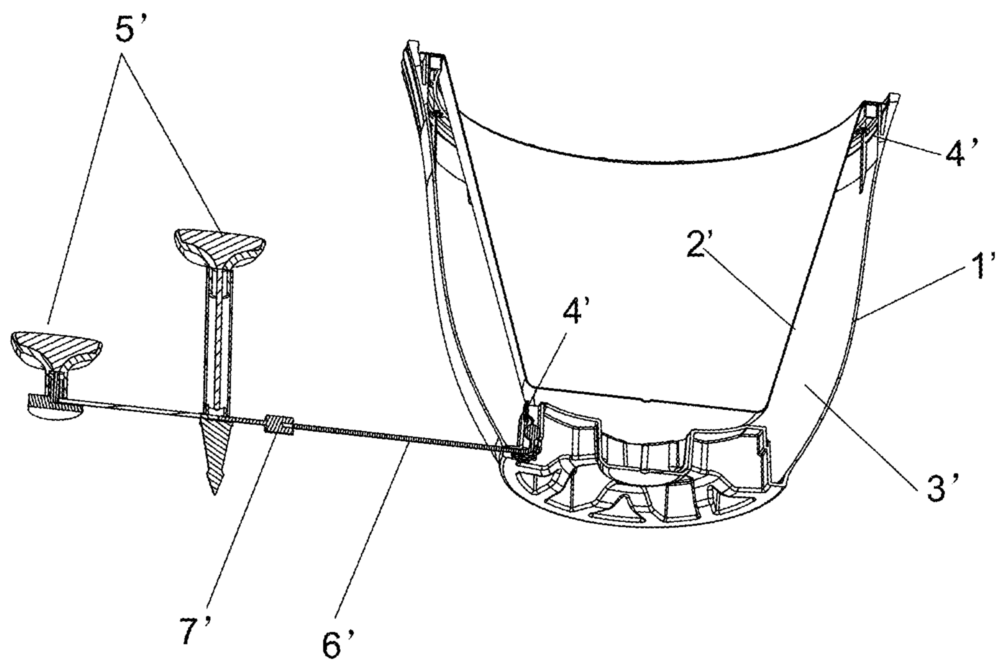
FIG. 9 is a vertical sectional view of the environmental-friendly luminous flowerpot according to Embodiment 4 of the present invention.
Figure 10:
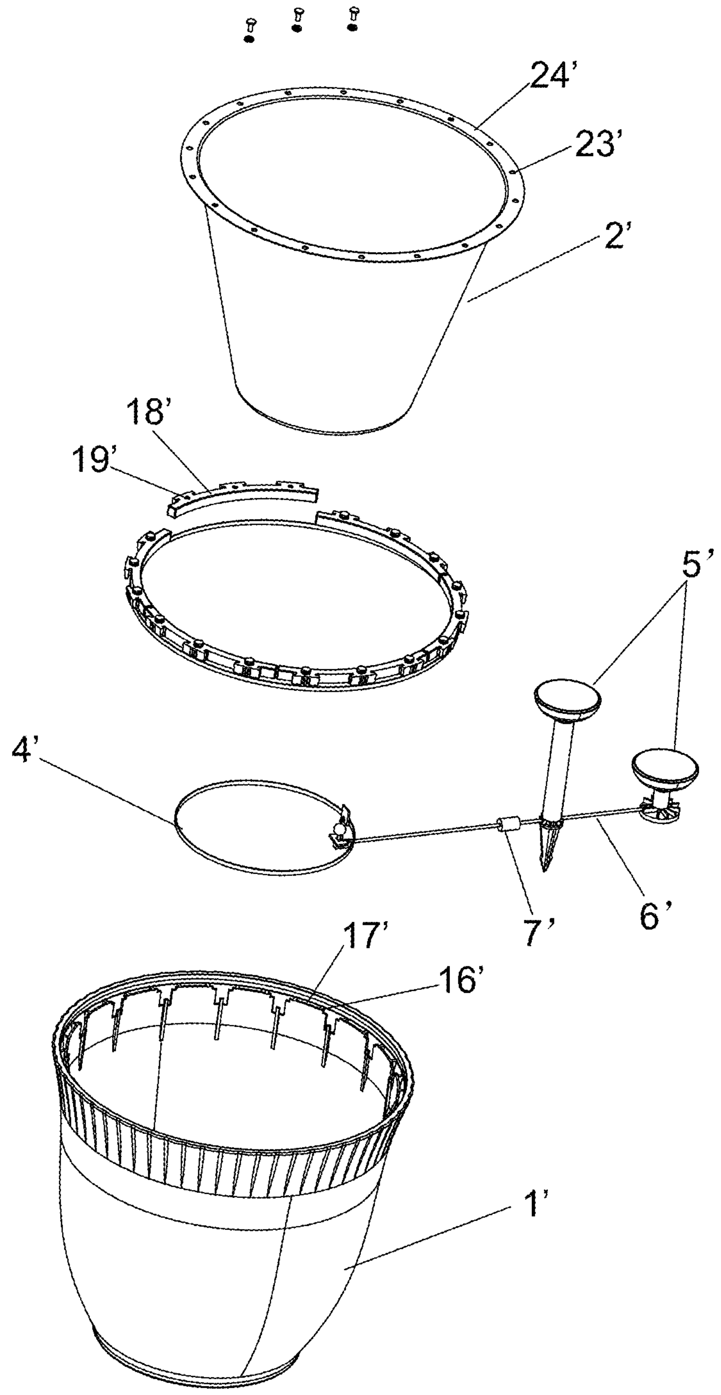
FIG. 10 is an exploded view of the environmental-friendly luminous flowerpot according to Embodiment 4 of the present invention.

FIGS. 8-10 show Embodiment 4 of an environmental-friendly luminous flowerpot of the present invention, which is different from Embodiment 3 in that: the inner pot body 2' is a soft pot body and has a mounting ring 24' extending outward at the inner top opening 2-1', the mounting ring 24' has a plurality of mounting holes 23' distributed at intervals; the plurality of mounting holes 23' are generally holes lined with a metal ring; the outer pot body 1' has a plurality of protrusions 16' protruding from an annular inner wall of the outer top opening 1-1' of the outer pot body 1', each protrusion 16' has a plurality of holes 17'; a plurality of supporting arc bars 18' distributed annually for supporting the inner pot body 2' is connected to the plurality of protrusions 16', each supporting arc bar 18' has one or more screw holes 19', the inner pot body 2' is connected to the outer pot body 1' by a plurality of screws, each screw passing through the corresponding mounting hole 23' of the inner pot body 2' and the corresponding screw hole 19' to be screwed into.

The protection scope of the present invention is not limited to each embodiment described in this description. Any changes and replacements made on the basis of the scope of the present invention patent and of the description shall be included in the scope of the present invention patent.

The invention claimed is:

1. An environmental-friendly luminous flowerpot, comprising:

a pot body;

one or more light-emitting elements disposed inside the pot body;

a solar device;

a tray is disposed inside the pot body, a supporting rod is connected to the tray and a bottom of the pot body to support the tray;

wherein, the pot body is semitransparent and is made of an herb-plastic composite environmental-friendly material;

the one or more light-emitting elements are electrically connected to the solar device;

the supporting rod is a hollow tube with a top opening and a bottom opening which vertically stands between the tray and the bottom of the pot body;

the tray divides an inner space of the pot body into an upper layer for cultivating plants and a lower layer for mounting the one or more light-emitting elements which are resisted against an inner wall of the pot body;

the tray has a first central hole and the bottom of the pot body has a second central hole, both central holes allow water to pass through, the supporting rod has a top opening which communicates with the first central hole, and a bottom opening which communicates with the second central hole centered on the bottom of the pot body.

2. The flowerpot of claim 1, wherein the pot body is manufactured by following steps: the herb-plastic composite environmental-friendly material is melted at a high temperature and then pressed or injected or rolled by an apparatus to form the pot body with an expected shape and texture;

plant particles having different colors are added in the herb-plastic composite environmental-friendly material during melting so as to produce the multi-colored semitransparent pot body.

3. The flowerpot of claim 1, wherein a filtering element is disposed in the top opening of the supporting rod for allowing the water to pass through and prevent mud from escaping.

4. The flowerpot of claim 1, wherein the pot body comprises an outer pot body with an outer top opening and an inner pot with an inner top opening disposed inside the outer pot body, and a space is defined between the outer pot body and the inner pot body for mounting the one or more light-emitting elements;

the inner pot body has an annular flange extending outward at the inner top opening to join with an edge of the outer top opening of the outer pot body, the inner pot body and the outer pot body are mounted together to form a complete outer pot body, the inner pot body is used for cultivating plants.

5. The flowerpot of claim 4, wherein the pot body comprises an outer pot body with an outer top opening and an inner pot with an inner top opening disposed inside the outer pot body, and a space is defined between the outer pot body and the inner pot body for mounting the one or more light-emitting elements;

the inner pot body is a hard pot body, the outer pot body has a plurality of steps each protruding from an annular inner wall of the outer pot body at the outer top opening, and an annular mounting groove is formed at the annular inner wall of the outer pot body over the plurality of steps for receiving a top edge of the inner pot body at the inner top opening;

and the top edge of the inner pot body inside the mounting groove is sealed to the annular inner wall of the outer pot body by waterproof glue.

6. The flowerpot of claim 4, wherein the pot body comprises an outer pot body with an outer top opening and an inner pot with an inner top opening disposed inside the outer pot body, and a space is defined between the outer pot body and the inner pot body for mounting the one or more light-emitting elements;

the inner pot body is a soft pot body and has a mounting ring extending outward at the inner top opening, the mounting ring has a plurality of mounting holes distributed at intervals;

the outer pot body has a plurality of protrusions protruding from an annular inner wall of the outer top opening of the outer pot body;

a plurality of supporting arc bars distributed annually for supporting the inner pot body is connected to the plurality of protrusions, each supporting arc bar has one or more screw holes, the inner pot body is connected to the outer pot body by a plurality of screws, each screw passing through the corresponding mounting hole of the inner pot body and the corresponding screw hole to be screwed into.

7. The flowerpot of claim 1, wherein the one or more light-emitting elements are a plurality of LED lamps, which are distributed annularly at regular intervals on an annular inner wall of the pot body.

8. The flowerpot of claim 1, wherein the solar device comprises a solar photovoltaic panel and an energy storage battery, a solar module is connected between the solar photovoltaic panel and the energy storage battery, and a light control device is disposed on the solar module.

9. The flowerpot of claim 1, wherein the pot body has a wire outlet hole at the bottom of the pot body, a waterproof wire passes through the wire outlet hole to electrically connect the one or more light-emitting elements with the solar device.

10. The flowerpot of claim 1, wherein the herb-plastic composite environmental-friendly material is a reinforced composite material prepared by mixing natural plant fibers with polypropylene or polyethylene and by means of a mixing technique;

the natural plant fibers being one of or a mixture of several of coir fibers, pulp fibers, rice husk, rice bran, rice straw, wheat straw, corn straw, bamboo fibers, bagasse, reed canes, coconut fibers, pine wood, and arbor;

the plant fiber content in the herb-plastic composite environmental-friendly material is 30%-70% (wt).

* * * * *